(12) United States Patent
Krouglov et al.

(10) Patent No.: US 6,769,006 B2
(45) Date of Patent: Jul. 27, 2004

(54) METHOD AND APPARATUS FOR CALCULATING A RECIPROCAL

(75) Inventors: Alexei Krouglov, Etobicoke (CA); Jie Zhou, North York (CA); Daniel Gudmunson, Newmarket (CA)

(73) Assignee: Sicon Video Corporation, Richmond Hill (CA)

( * ) Notice: Subject to any disclaimer, the term of this patent is extended or adjusted under 35 U.S.C. 154(b) by 603 days.

(21) Appl. No.: 09/781,951

(22) Filed: Feb. 14, 2001

(65) Prior Publication Data

US 2002/0143840 A1 Oct. 3, 2002

(30) Foreign Application Priority Data

Dec. 20, 2000 (CA) .............................................. 2329104

(51) Int. Cl.$^7$ ................................................ G06F 7/52
(52) U.S. Cl. ..................................... 708/502; 708/654
(58) Field of Search ................................ 708/502, 654

(56) References Cited

U.S. PATENT DOCUMENTS

| | | | |
|---|---|---|---|
| 3,648,038 A | 3/1972 | Sierra .......................... | 235/164 |
| 4,707,798 A | 11/1987 | Nakano ...................... | 364/765 |
| 4,823,301 A | 4/1989 | Knierim ...................... | 364/761 |
| 5,012,438 A | 4/1991 | Yamaguchi .................. | 364/765 |
| 5,206,823 A | 4/1993 | Hesson ........................ | 364/748 |
| 5,220,524 A | 6/1993 | Hesson ........................ | 364/748 |
| 5,274,580 A | 12/1993 | Keryvel et al. .............. | 364/764 |
| 5,341,321 A | 8/1994 | Karp et al. .................. | 364/748 |
| 5,377,134 A | 12/1994 | Faget ........................... | 364/765 |
| 5,862,059 A | 1/1999 | Matula et al. ......... | 364/718.01 |
| 5,870,321 A | 2/1999 | Konrad ........................ | 364/748 |
| 6,128,637 A | 10/2000 | Yasui et al. .................. | 708/290 |
| 6,223,192 B1 * | 4/2001 | Oberman et al. ........... | 708/270 |
| 6,256,653 B1 * | 7/2001 | Juffa et al. ................... | 708/290 |
| 6,330,000 B1 * | 12/2001 | Fenney et al. ............... | 345/586 |

FOREIGN PATENT DOCUMENTS

| | | | | |
|---|---|---|---|---|
| EP | 0 938 042 | 8/1999 | ............. | G06F/7/52 |
| EP | 1 006 436 | 6/2000 | ............. | G06F/7/52 |

OTHER PUBLICATIONS

ANS/IEEE Std. 754–1985, entitled "An American National Standard—IEEE Standard for Binary Floating–Point Arithmetic".

Ferrari, D., "A Division Method Using Parallel Multiplier", IEEE Transactions on Electronic Computers, Apr. 1967, pp. 224–226.

Takagi, N., "Powering by a Table Look–Up and a Multiplication with Operand Modification", IEEE Transactions on Computers, vol. 47, No. 11, Nov. 1998, pp. 1216–1222.

* cited by examiner

Primary Examiner—David H. Malzahn
(74) Attorney, Agent, or Firm—Dimock Stratton LLP; Mark B. Eisen

(57) ABSTRACT

A method and apparatus for the calculation of the reciprocal of a normalized mantissa M for a floating-point input number D. A formula for determining the minimum size for the look-up table in accordance with the required precision is provided, as well as formulas for calculating look-up table entries. The look-up table stores the initiation approximations and the correction coefficients, which are addressed by the corresponding number of the mantissa's most significant bits and used to obtain the initial approximation of the reciprocal by means of linear interpolation requiring one subtraction operation and one multiplication operation. The result of the linear interpolation may be fed to a Newton-Raphson iteration device requiring, for each iteration, two multiplication operations and one two's complement operation, thereby doubling the precision of the reciprocal.

11 Claims, 3 Drawing Sheets

METHOD AND APPARATUS FOR CALCULATING A RECIPROCAL

FIELD OF INVENTION

This invention relates to signal processing. In particular, this invention relates to a method and apparatus for calculating the reciprocal or inverse of a number.

BACKGROUND OF THE INVENTION

Calculating the reciprocal plays an important role in the division operation, especially with floating-point decimal numbers. By using a reciprocal, the result of the division of two numbers can be obtained by multiplying the dividend by the inverse of the divisor. This division method can be used to increase the speed of processing complex calculations in digital processing devices such as computers and in application-specific integrated circuits such as digital signal processing (DSP) processors.

According to IEEE Standard for Binary Floating-Point Arithmetic 0754P-1985, which is incorporated herein by reference, floating-point standard numbers in floating-point formats are packed within 32 bits with a significand (mantissa) 24 bits long in single precision, or packed within 64 bits with a significand 53 bits long in double precision.

Several interpolation and iteration methods are widely used by developers for calculating reciprocals, including direct approximation, linear interpolation, square interpolation, cubic interpolation, and so on.

In the direct approximation method of obtaining reciprocal of a number, all possible mantissas for reciprocals are stored in a ROM table. Using this method the result can be obtained quickly, but this method requires an extremely large memory capacity. For example, to obtain a reciprocal according to the IEEE standard 754 single precision floating-point format requires $2^{23} \times 23 = 184$ Mbits of memory.

The linear interpolation method is based on the theorem of a mean value from calculus, and can be summarized for the calculation of reciprocal as follows:

$$\frac{1}{x} = \frac{1}{x_0} - \frac{1}{\xi^2}(x - x_0) \quad (1)$$

where $\xi \in [x_0, x]$ and $x \geq x_0$.

It is also possible to use square interpolation, cubic interpolation and other interpolation methods to obtain a reciprocal with the required precision. However, all of these methods require additional multiplication operations, and require additional memory to store the correction coefficients. The main disadvantage of interpolation methods is that as the desired precision increases, the amount of memory required to store the necessary data also increases.

In digital computers the Newton-Raphson iteration method is widely used for calculating reciprocals. This method gives the solution of the equation $$f(z) = 0 \quad (2)$$

based on employing the recurrent formula $$z_{i+1} = z_i - \frac{f(z_i)}{f'(z_i)} \quad (3)$$

The values $z_i$ obtained after iteration i are quadratically converging toward z, so the corresponding errors $\in$ after iteration i and iteration i+1 relate by the expression:

$$\in(Z_{i+1}) \leq \in^2(Z_i) \quad (4)$$

Employing the Newton-Raphson method for calculating reciprocal $$x = \frac{1}{a}$$

produces the following expression:

$$x_{i+1} = x_i * (2 - a * x_i) \quad (5)$$

As can be seen from equation (5), every iterative step of this method involves two multiplication operations performed in sequence, and one '2's complement' operation. The precision of a reciprocal thus doubles after each iterative step. The disadvantage of the Newton-Raphson iteration method by itself is that it can require multiple iteration steps to obtain a reciprocal with the required precision.

To overcome the above disadvantages methods have evolved to use some type of interpolation method to obtain the initial approximation of a reciprocal, and then employ an iteration method based on this approximation. As an example, it has been proposed to use inverse tables to obtain the initial values for consecutive iterations.

SUMMARY OF THE INVENTION

The present invention provides a method and apparatus for dividing a value which can deliver the inverse (reciprocal) of a number quickly and with a high precision.

According to the method of the invention, linear interpolation is employed to obtain an approximation of the reciprocal of a number. This approximation may then be used as an input value for Newton-Raphson iterations to calculate a reciprocal with high precision.

Unlike prior art methods, the method of the invention provides a formula for calculating a minimum number of entries in a look-up table to obtain the approximation of a reciprocal with required precision. The method of the invention also provides formulas for calculating initial approximations and correction coefficients for composing entries in look-up tables. An apparatus for implementing the method of the invention comprises a look-up table memory for storing these values, an integer multiplier, and a subtracter.

The present invention thus provides a method for generating an output signal representing an output value approximating a reciprocal of input value D having a normalized mantissa M (where $1 \leq M < 2$) represented by an input signal, the input signal comprising a set of $N_0$ most significant bits and the output signal approximating the reciprocal with a desired precision $\in = 2^{-N}$ where $N \leq N_0$, comprising the steps of: a for a set of P most significant bits of the input signal, generating a number n of entries in a plurality of lookup tables where $n = 2^P$, including the sub steps of: i. generating a set of input entries $y_i$ comprising a set of N significant bits in a first lookup table, where $i = 0, \ldots, n-1$; and ii. generating a set of input entries $K_i$ comprising a set of (N−P) significant bits in a second lookup table, where i=0, ..., n-1; b. finding the entries $y_i$ and $K_i$ in the lookup tables corresponding to the set of P most significant bits of the input signal; c. multiplying $K_i$ by a signal comprising a set of (N-P) significant bits following the set of P most significant bits of the input signal; and d. subtracting a set of (N-P) most significant bits from the set of N significant bits of the entry $y_i$.

In further aspects of the method of the invention: the step of generating n entries in the lookup tables comprises the sub steps of: iii. calculating the minimum number l of lookup table entries necessary to obtain a precision higher than the desired precision, where $$\frac{2l+1}{2l+2} - \sqrt{\frac{l}{l+1}} < \varepsilon \text{ and } \frac{2l-1}{2l} - \sqrt{\frac{l-1}{l}} \geq \varepsilon$$

and iv. finding a required minimum number n of lookup table entries for n=$2^P$, where $2^{P-1}$<l and $2^P \geq l$; the step of generating a set of input entries in the first lookup table comprises the sub steps of: A. calculating $$\hat{y}_i = \frac{\sqrt{x_i\left(x_i + \frac{1}{n}\right)} + \frac{1}{2n}}{x_i\left(x_i + \frac{1}{n}\right)}$$

where i=0, ..., n-1, $x_0$=1, and $$x_{i+1} = x_i + \frac{1}{n},$$

and B. finding entries $y_i$ comprising a set of N significant bits and approximating a mantissa of $\hat{y}_i$ for i=0, ..., n-1; and/or the step of generating a set of input entries in the second lookup table comprises the sub steps of: calculating $$\hat{k}_i = \frac{2^{N-P}}{x_i\left(x_i + \frac{1}{n}\right)} \text{ where } i = 0, ..., n-1, x_0 = 1, \text{ and } x_{i+1} = x_i + \frac{1}{n}$$

and finding entries $K_i$ comprising a set of (N-P) significant bits and approximating integer parts of $\hat{k}_i$ for i=0, ..., n-1.

The present invention further provides an apparatus comprising at least one processor for calculating an inverse I having a precision $\in=2^{-N}$ of an input value D with normalized mantissa M (where $1 \leq M < 2$) comprising a set of $N_0$ most significant bits where $N_0 \geq N$, the apparatus comprising a first memory forming a lookup table addressed as a function of P most significant bits of the mantissa M and having an output $I_0$ comprising a set of N significant bits; a second memory forming a lookup table addressed as a function of P most significant bits of the mantissa M and having an output K comprising a set of (N-P) significant bits; a multiplier of size (N-P)×(N-P) having two inputs of a set of(N-P) significant bits following the set of P most significant bits of the mantissa M and of the output K, and an output MU comprising a set of (N-P)×(N-P) significant bits; and an adder/subtracter having an output I and having two inputs connected to respectively receive the output $I_0$ and the set of (N-P) most significant bits of the output MU.

In further aspects of the apparatus of the invention: the first and second memories are combined into a storage device which stores both $I_0$ and K and is addressed as a function of P most significant bits of the mantissa M; the apparatus further comprises a device for performing a programmed Newton-Raphson iteration based on I; the first memory comprises a read only memory (ROM); the second memory comprises a read only memory (ROM); the storage device comprises at least one read only memory (ROM); and or the apparatus is included in a digital signal processing device.

BRIEF DESCRIPTION OF THE DRAWINGS

In drawings which illustrate by way of example only a preferred embodiment of the invention.

DETAILED DESCRIPTION OF THE INVENTION

The invention is applicable to calculations utilizing the mantissa M of a binary number D in the floating-point format. The mantissa M of the input number is assumed to have been preliminarily normalized, i.e. being equal to or more than one and less than two, such that $1 \leq M < 2$.

Figure 1:
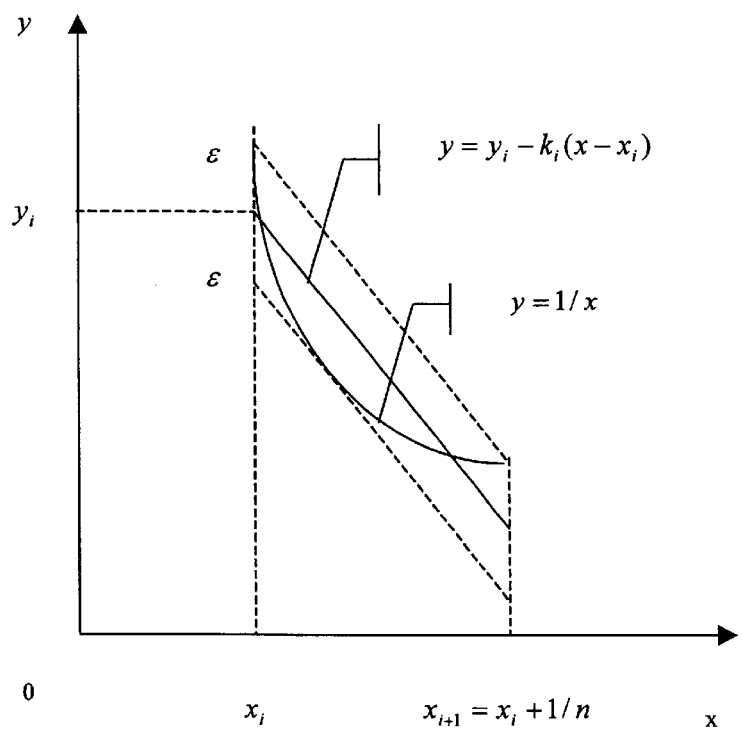
FIG. 1 is a graph showing the linear interpolation method as used in the present invention.

FIG. 1 illustrates a preferred embodiment of the linear interpolation method used in the method of the invention to approximate the reciprocal of a number. Relative to the direct approximation method, linear interpolation significantly reduces the number of entries required to be stored in a look-up table. To achieve an N-bit precision $\in=2^{-N}$ for the mantissa M of reciprocal while employing the direct approximation method, the look-up table would require $2^N-1$ equally spaced entries; whereas to obtain the same N-bit precision $\in=2^{-N}$ for the reciprocal's mantissa using the linear interpolation method, it is sufficient to have $2^P$ entries in the look-up table where $P \leq N$. Each entry is distinct from the previous entry by $2^{-P}$, so P most significant bits (MSB) of the mantissa M constitute the look-up table address.

Values $x_i$ and $x_{i+1}$, in FIG. 1 represent two consecutive entries in the look-up table. Value $y_i$ represents the approximation of the value $$\frac{1}{x_i}$$

that is stored in the look-up table. Value $(x-x_i)$ is represented by mantissa's bits next after its first P MSB.

The approximation of a required reciprocal is expressed by the following formula:

$$y = Y_i - k_i(x-x_i) \quad (6)$$

where $k_i$ is correction coefficient, and $x_i \leq x < x_{i+1}$.

To obtain a reciprocal's mantissa M with N-bit precision, at least (N-P) bits after P MSB of the mantissa M must be matched with at least (N-P) significant bits of correction coefficient $k_i$ shown in FIG. 1. These coefficients are stored in the look-up table in integer form $K_i = 2^{N-P} \times k_i$. Therefore, to obtain the reciprocal's mantissa M with N-bit precision involves the steps of multiplying the (N-P) bits of the mantissa M by the (N−P) bits of coefficient $K_i$ in the integer multiplier of size (N−P)×(N−P), dividing the result by $2^{N-P}$, and then subtracting the quotient from $y_i$.

The N bits of mantissa M for $y_i$ and the (N−P) bits for integer $K_i$ are stored in the look-up table. Values $y_i$ and $K_i$ are calculated according to the following formulas with N and (N−P) precision, respectively:

$$y_i \cong \frac{\sqrt{x_i\left(x_i + \frac{1}{n}\right)} + \frac{1}{2n}}{x_i\left(x_i + \frac{1}{n}\right)} \quad (7)$$

$$K_i \cong \frac{2^{N-P}}{x_i\left(x_i + \frac{1}{n}\right)} \quad (8)$$

where n is the number of entries in the look-up table.

The maximum error $\in$ of the linear interpolation method for finding the reciprocal of =a mantissa M, normalized to lie between 1 and 2, depends on n and is expressed by the following formula:

$$\varepsilon = \frac{2n+1}{2n+2} - \sqrt{\frac{n}{n+1}} \quad (9)$$

The necessary number n of entries in the look-up table can be determined from formula (9) where the required maximum error c is known.

For example, for n=64 the maximum error $\in$ of a linear interpolation method for obtaining a reciprocal is equal to $\in \approx 2.98 * 10^{-5} > 2^{-16}$, while for n=128 the maximum error according to the linear interpolation method is $\in \approx 7.54 * 10^{-6} < 2^{-16}$.

Figure 2:
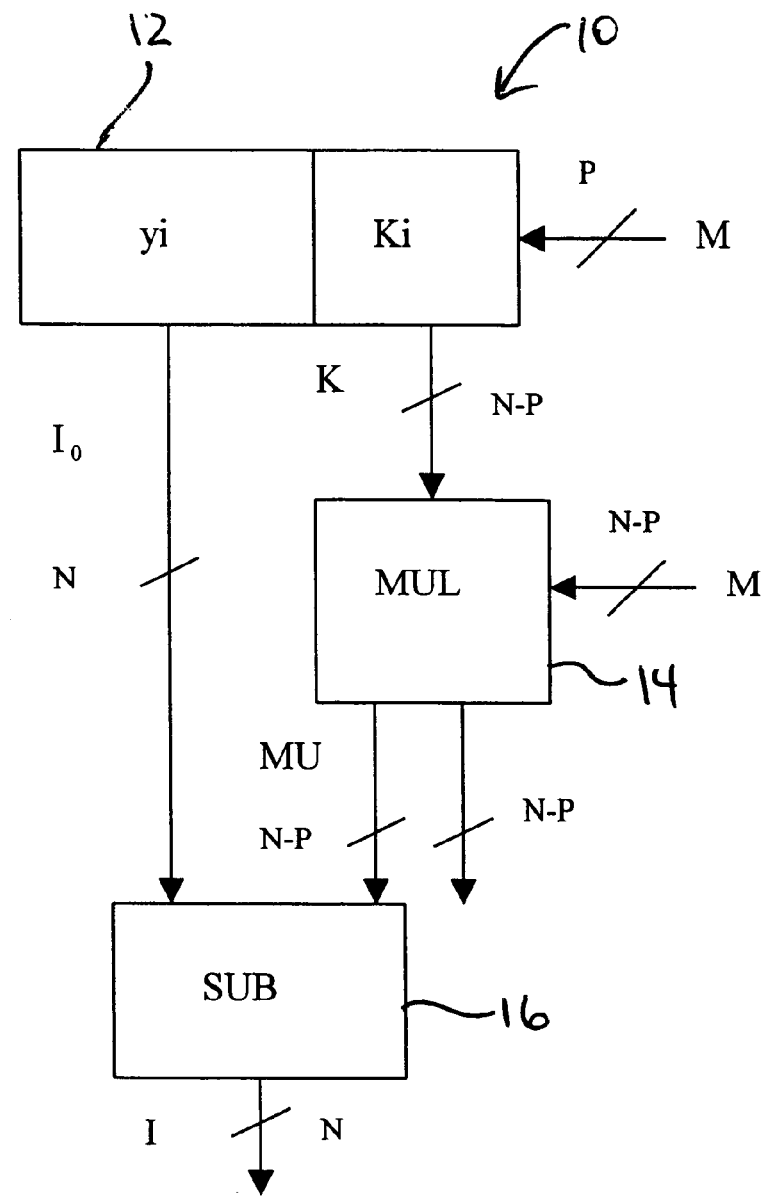
FIG. 2 is a block diagram showing a linear interpolation apparatus according to the invention for obtaining N-bit precision for the mantissa of a reciprocal.

FIG. 2 illustrates an apparatus 10 for calculating reciprocals according to the invention, which implements the method as described above. The P MSB of mantissa M of the input number D form the address line of the ROM 12 that has $2^P$ entries. The ROM 12 preferably stores N bits for the inverse $y_i$ of a mantissa's P MSB (although it is sufficient to store (N−1) bits since the leading bit of the inverse is always '0') and (N−P) bits of the correction coefficient $K_i$, to perform the linear interpolation.

The (N−P) bits of correction coefficients K are provided to one input of integer multiplier 14 having a size (N−P)×(N−P). Provided to another input of the multiplier 14 is the (N−P) bits value next after the P MSB of the input mantissa M. The (N−P) MSB MU of the product obtained by multiplying (N−P)×(N−P) bits long are provided to an input of integer subtracter 16 having a size N. The P MSB of the input MU are all '0', and the (N−P) least significant bits (LSB) of the product are discarded. Provided to another input of the subtracter 16 are N bits of the reciprocal's approximation $y_i$ from the ROM 12 (shown as $I_0$ in FIG. 2). The result of subtraction forms the N bits output (shown as I in FIG. 2) of the apparatus 10.

Note if P MSB of the input mantissa M are equal to '1' (i.e. the most significant bit is '1' while other (P−1) bits are '0'), then the output I can be represented as 1's complement of (N−P) bits of MU, which simplifies the calculations.

Figure 3:
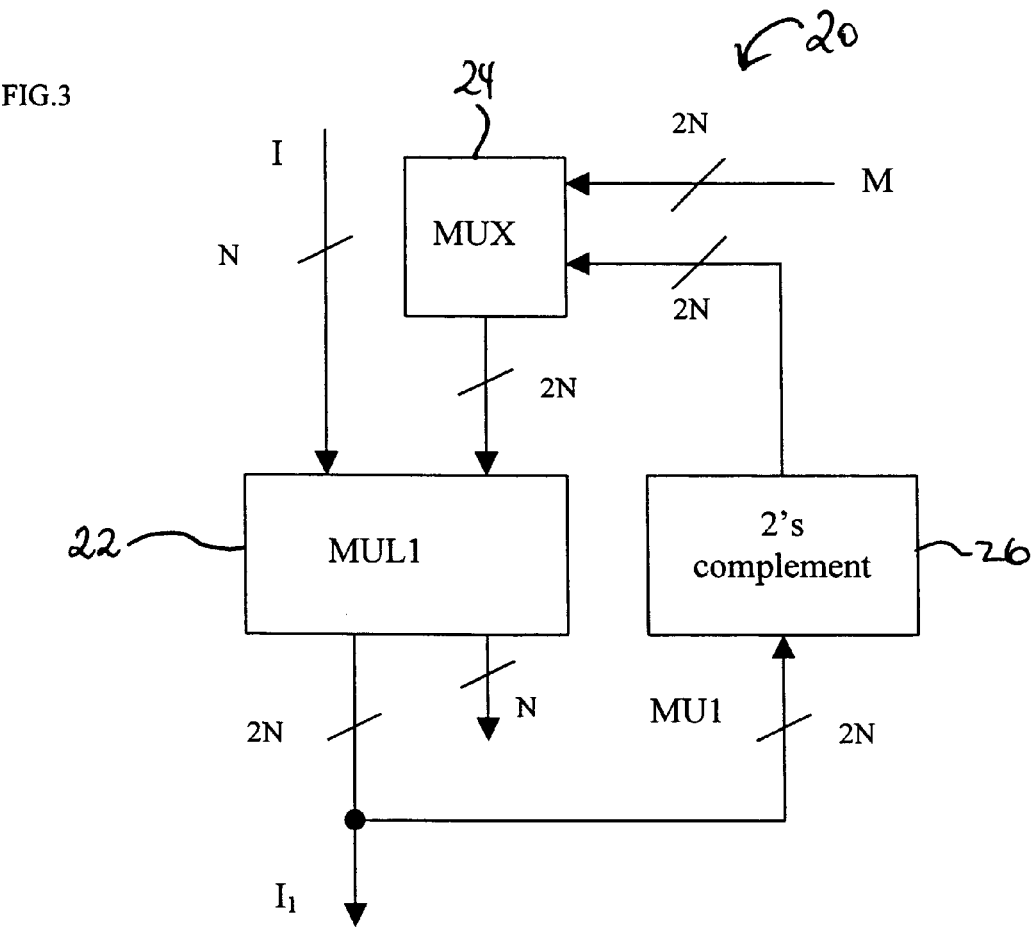
FIG. 3 is a block diagram showing a Newton-Raphson iteration apparatus for obtaining 2N-bit precision for the mantissa of a reciprocal.

FIG. 3 illustrates an apparatus 20 for performing Newton-Raphson iterations of the result of linear interpolation, to increase the precision of the result from N-bit to 2N-bit precision. The N bits of output I from the interpolation apparatus 10 are provided to an input of integer multiplier 22 having a size N×2N. Provided to another input of the multiplier 22 is 2N bits of output from the multiplexer 24. Multiplexer 24 alternately selects 2N MSB of the input mantissa M (padded with appended '0's if necessary) and 2N bits of the output of a 2's complement device 26.

Multiplier 22 produces a result 3N bits long. The N least significant sets of the product of this multiplication is discarded. The 2N most significant bits MU1 of the product are provided to the 2's complement device 26. The output of the 2's complement device 26 2N bits long is provided to the multiplexer 24. On the second pass through the multiplier 22 the 2N MSB of the product of the multiplication form the 2N bits output of the apparatus 20 (shown as an $I_1$ in FIG. 3).

While a preferred embodiment of the present invention has been shown and described by way of example only, it will be apparent to those skilled in the art that changes and modifications may be made without departing from the scope of the invention, as set out in the appended claims.

We claim:

1. A method for generating an output signal representing an output value approximating a reciprocal of input value D having a normalized mantissa M (where $1 \leq M < 2$) represented by an input signal, the input signal comprising a set of $N_0$ most significant bits and the output signal approximating the reciprocal with a desired precision $\in = 2^{-N}$ where $N \leq N_0$, comprising the steps of:

a. for a set of P most significant bits of the input signal, generating a number n of entries in a plurality of lookup tables where $n=2^P$, including the sub steps of:
  i. generating a set of input entries $y_i$ comprising a set of N significant bits in a first lookup table, where i=0, ..., n−1; and
  ii. generating a set of input entries $K_i$ comprising a set of (N−P) significant bits in a second lookup table, where i=0, ..., n−1;
 b. finding the entries $y_i$ and $K_i$ in the lookup tables corresponding to the set of P most significant bits of the input signal;
 c. a multiplying $K_1$ by a signal comprising a set of (N−P) significant bits following the set of P most significant bits of the input signal; and
 d. subtracting a set of (N−P) most significant bits from the set of N significant bits of the entry $y_i$.

2. The method of claim 1 wherein the step of generating n entries in the lookup tables comprises the sub steps of:
 iii. calculating the minimum number l of lookup table entries necessary to obtain a precision higher than the desired precision, where $$\frac{2l+1}{2l+2} - \sqrt{\frac{l}{l+1}} < \varepsilon$$

and $$\frac{2l-1}{2l} - \sqrt{\frac{l-1}{l}} \geq \varepsilon;$$

and
 iv. finding a required minimum number n of lookup table entries for $n=2^P$, where $2^{P-1} < 1$ and $2^P \geq 1$.

3. The method of claim 1 wherein the step of generating a set of input entries in the first lockup table comprises the sub steps of:

A. calculating $$\hat{y}_i = \frac{\sqrt{x_i\left(x_i + \frac{1}{n}\right)} + \frac{1}{2n}}{x_i\left(x_i + \frac{1}{n}\right)}$$

where i=0, . . . , n−1, $x_0$=1, and $$x_{i+1} = x_i + \frac{1}{n}; \text{ and}$$

B. finding entries $y_i$ comprising a set of N significant bits and approximating a mantissa of $\widehat{y}_i$ for i=0, . . . , n−1.

4. The method of claim 1 wherein the step of generating a set of input entries in the second lookup table comprises the sub steps of:

A. calculating $$\hat{K}_i = \frac{2^{N-P}}{x_i\left(x_i + \frac{1}{n}\right)}$$

where i=0, . . . , n−1, $x_0$=1, and $$x_{i+1} = x_i + \frac{1}{n};$$

and

B. finding entries $K_i$ comprising a set of(N−P) significant bits and approximating integer parts of $\widehat{K}_i$ for i=0, . . . , n−1.

5. An apparatus comprising at least one processor for calculating an inverse I having a precision $\in = 2^{-N}$ of an input value D with normalized mantissa M (where $1 \leq M < 2$) comprising a set of $N_0$ most significant bits where $N_0 \geq N$, the apparatus comprising a first memory forming a lookup table addressed as a function of P most significant bits of the mantissa M and having an output $I_0$ comprising a set of N significant bits;

a second memory forming a lookup table addressed as a function of P most significant bits of the mantissa M and having an output K comprising a set of(N−P) significant bits;

a multiplier of size(N−P)×(N−P) having two inputs of a set of (N−P) significant bits following the set of P most significant bits of the mantissa M and of the output K, and an output MU comprising a set of (N−P)×(N−P) significant bits; and an adder/subtracter having an output I and having two inputs connected to respectively receive the output $I_0$ and the set of (N−P) most significant bits of the output MU.

6. The apparatus of claim 5 wherein the first and second memories are combined into a storage device which stores both $I_0$ and K and is addressed as a function of P most significant bits of the mantissa M.

7. The apparatus of claim 6 wherein the storage device comprises at least one read only memory (ROM).

8. The apparatus of claim 5 further comprising a device for performing a programmed Newton-Raphson iteration based on I.

9. The apparatus of claim 5 wherein the first memory comprises a read only memory (ROM).

10. The apparatus of claim 5 wherein the second memory comprises a read only memory (ROM).

11. A digital signal processing device comprising the apparatus of claim 5.

* * * * *